US008831164B2

(12) United States Patent
Lu (10) Patent No.: US 8,831,164 B2
(45) Date of Patent: Sep. 9, 2014

(54) METHOD AND APPARATUS FOR COOPERATIVE COMMUNICATIONS BETWEEN GROUPS OF COMMUNICATION UNITS USING A TIME REVERSED CHANNEL RESPONSE

(75) Inventor: Ning Hsing Lu, Clifton, NJ (US)

(73) Assignee: Exelis Inc, McLean, VA (US)

( * ) Notice: Subject to any disclaimer, the term of this patent is extended or adjusted under 35 U.S.C. 154(b) by 432 days.

(21) Appl. No.: 13/233,445

(22) Filed: Sep. 15, 2011

(65) Prior Publication Data

US 2013/0070814 A1 Mar. 21, 2013

(51) Int. Cl.
*H04B 7/02* (2006.01)
*H04B 1/40* (2006.01)

(52) U.S. Cl.
USPC .............................. 376/267; 455/500; 455/88

(58) Field of Classification Search
CPC .......... H04B 7/02; H04B 7/024; H04B 7/026; H04B 7/04; H04B 7/0404; H04B 7/0413; H04L 27/26
USPC ......... 375/132, 133, 140, 141, 219, 220, 222, 375/259, 260, 267; 455/39, 500–504, 88, 455/553.1
See application file for complete search history.

(56) References Cited

U.S. PATENT DOCUMENTS

| 6,434,366 B1 * | 8/2002 | Harrison et al. ................. 455/69 |
| 7,218,682 B2 | 5/2007 | Mayor et al. |
| 2010/0309829 A1 * | 12/2010 | Phan Huy et al. ............ 370/281 |
| 2012/0057510 A1 * | 3/2012 | Phan Huy et al. ............ 370/281 |
| 2012/0155515 A1 * | 6/2012 | Smith et al. .................... 375/219 |
| 2012/0257660 A1 * | 10/2012 | Smith et al. .................... 375/224 |

OTHER PUBLICATIONS

Ning H. Lu, Linearized, Unified Two-Ray Formulation for Propagation over a Plane Earth, Sincon/05—Sensors for Industry Conference, Feb. 2005, 6 pages.
U.S. Appl. No. 12/536,177, filed Aug. 5, 2009, "Method and Apparatus for Cooperative Communications Between Groups of Communication Units", 51 pages.

* cited by examiner

*Primary Examiner* — Young T. Tse
(74) *Attorney, Agent, or Firm* — Edell, Shapiro & Finnan LLC (57) ABSTRACT

Enhanced reception in a communication system is achieved by applying a time domain generated time-reversed channel response to signals transmitted from a group of transmitter to a group of receivers. The time-reversed channel response is generated from a radio frequency channel response derived from signals previously received from the group of receivers, but reversed in the time domain. The time-reversed channel response is convolved with an information signal that when transmitted in a coordinated fashion from the group of transmitters, the signals arrive at each receiver in the group of distant receiving communication devices at approximately the same time where the signals coherently combine, thereby increasing signal power at the receivers. This permits detection at a greater range or with a lower bit error rate. In addition, the many-to-many configuration enables signal power from each transmitter to be focused temporarily and spatially on each receiver.

30 Claims, 9 Drawing Sheets

METHOD AND APPARATUS FOR COOPERATIVE COMMUNICATIONS BETWEEN GROUPS OF COMMUNICATION UNITS USING A TIME REVERSED CHANNEL RESPONSE

BACKGROUND

1. Technical Field

Embodiments of the present invention relate to methods and apparatus for enhancing transmission and reception of signals between groups of communication units and, more particularly, to techniques for synchronously combining coordinated transmissions from plural communication units of a group at receiving communication units within a distant group to extend range performance while maintaining the communication protocol employed for the communication.

2. Discussion of the Related Art

One factor affecting range performance in wireless communication systems is the power with which signals are transmitted. Generally, the strength of a received signal is proportional to the transmit power and inversely proportional to the $n^{th}$ power of the range between the transmitter and receiver. Depending on the underlying terrain, the value of n could generally range from 2 to 6. At a given transmit power, as the range between a transmitting device and a receiving device increases, the signal strength at the receiving device becomes increasingly attenuated, eventually prohibiting reception. Range performance improves with increasing transmit power; conversely, lower transmit power reduces the maximum range at which transmitted signals can be detected.

Unfortunately, there are a number of circumstances in which transmit power is limited by equipment capabilities, operational requirements or both. For example, with mobile communication devices which rely on battery power supplies, the maximum transmit power may be limited by design to achieve a tradeoff between operating range and battery power consumption. Other equipment cost or performance considerations may dictate transmit power capabilities that limit operational range or limit system performance under harsh operating conditions.

In certain circumstances, a need may exist to minimize RF emissions. In military contexts, particularly in battlefield situations, minimizing transmit power reduces the likelihood of signal detection by hostile parties, thereby preventing the transmitter's position from being compromised. For example, in a situation where a small team of radio-equipped personnel is located within a hostile region and must communicate with a distant device, for any single radio to communicate with the distant device, considerable transmit power would be required, resulting in a significant opportunity for detection by hostile forces. Moreover, the transmit power level required to communicate over significant distances would likely drain the radio's battery more rapidly than desired. In other contexts, low transmit power levels may minimize interference with other devices, particularly in high bandwidth usage situations, such as with wireless telephony.

Operational parameters other than transmit power can be optimized for better range performance under certain conditions. For example, antenna gain may be increased using a directional antenna, or more sophisticated receiver schemes can be employed. In some cases, limited range performance (or, equivalently, limited transmit power) may be accommodated by using repeaters to boost the signal power at an intermediate location between the source transmitter and destination receiver. However, each of these techniques may increase size, cost and circuit complexity, overall system complexity, and increase energy requirements.

Prior techniques involving Cooperative Team Communications (CTC) use the inherent multipath equalizer or combiner capability in the radio (e.g., at a Rake receiver). For CTC, the source radios coordinate transmissions such that the source transmitters concurrently transmit the same information-bearing signal on the same communication channel to the distant destination radios, so that the signals arrive at the destination radios are all within their multipath processing windows. As a consequence of the spatial diversity, the destination radios essentially treat the received signals as though they were different multipath signals. The multipath equalizer or combiner in each destination radio determines timing offsets among the received signals, and the received signals are time aligned by phase rotating the signals in accordance with the estimated timing offsets. The combined signal has a greater signal-to-noise ratio (SNR) than the individual received signals, permitting detection at a greater range or with a lower bit error rate.

The synchronous combining takes place in the Rake receiver, thus the CTC performance depends on the efficiency of the combining. The number of signals that may be integrated depends on the number of taps of the Rake receiver. Tap spacing needs to be pre-determined, designed, and implemented. Once designed and implemented, the Rake receiver is difficult, if not impossible, to adapt to different operating conditions.

SUMMARY

Therefore, in light of the above, and for other reasons that become apparent when example embodiments of the present invention are fully described, an aspect of a present invention embodiment is to enhance the range performance of a group of communication devices communicating with a distant group of communication devices, thereby permitting communication over a range greater than that achievable by any single device transmitting at a particular power level. Another aspect of a present invention embodiment is to reduce the transmit power required from any single communication device in order to reduce the probability of signal interception by unintended recipients.

A further aspect of a present invention embodiment is to increase the overall signal strength of a transmitted signal at a group of receiving communication devices without having to increase the transmit power from an individual transmitting communication device.

Yet another aspect of a present invention embodiment is to coordinate signal transmissions of plural communication devices to effectively send the signals from plural locations that combine at a group of receiving communication devices and thereby improve the detectability of the information in these signals.

Still another aspect of a present invention embodiment is to take advantage of collective transmit power of clusters of communication devices to communicate signals with greater effective transmit power than is available from individual devices in the cluster.

The aforesaid aspects may be achieved individually and/or in combination, and it is not intended that a present invention embodiment be construed as requiring two or more of the aspects to be combined unless expressly required by the claims attached hereto.

Enhanced reception in a communication system is achieved by applying a time domain generated channel response, whose time domain function is reversed in time (i.e., inverted with respect to the time axis), to signals transmitted from a group of transmitters to a group of receivers. This "reversed in time" response is referred to herein as the "time-reversed channel response." The time-reversed channel response is estimated from a radio frequency channel response derived from signals previously received from the group of receivers, but reversed in the time domain. The time-reversed channel response is convolved with an information signal that when transmitted in a coordinated fashion from the group of transmitters, the signals arrive at each receiver in the group of distant receiving communication devices at approximately the same time where the signals coherently combine, thereby increasing signal power at the receivers. This permits detection at a greater range or with a lower bit error rate. In addition, the many-to-many configuration enables signal power from each transmitter to be focused on each receiver. The combined signal has a greater signal-to-noise ratio than the individual received signals, thereby permitting detection at a greater range or with a lower bit error rate without having to increase the transmit power of any individual transmitting communication device. Consequently, enhanced signal reception and range performance can be achieved in systems where transmit power is limited by operational constraints or equipment limitations.

An embodiment of the present invention achieves significantly enhanced communications performance by two-way cooperative communications between a group of communication devices and a distant group of communication devices. An embodiment of the present invention employs a one-to-one or many-to-many configuration. The many-to-many configuration enables cooperative and synchronized communications to be utilized for many versatile, effective, efficient, and unique applications. For example, a group of communication devices would be able to cooperatively communicate with a distant group at a greater range than would not be possible by the communication devices when operating independently. Further, a group of communication devices would be able to cooperatively communicate with a distant group at a minimal power level for covert, energy-efficient, or high-throughput operations.

Embodiments of the present invention provide several advantages. In particular, range performance of communications between groups of communication devices is enhanced, thereby permitting communication over a range greater than that achievable between any two single communication devices transmitting at the same power level. This aspect satisfies key operational needs for remote sensing and special operations.

Further, transmit power required for the communications from any single communication device is reduced. This reduces the probability of signal interception by unintended recipients, and minimizes the implementation cost (e.g., minimizes the size, weight, power, and cost of the implementation hardware). In addition, the reduction in required transmit power increases the energy efficiency of the transmitter power amplifier, thereby maximizing the life of the underlying application. Applications include various platforms including ground based, air-borne, and space-borne platforms. Platform types may include sensor nodes, user nodes, and mobile platforms.

Moreover, the signal detectability of a received signal at a group of distant communication devices is increased without having to increase the transmit power from an individual transmitting communication device. This maximizes the signal detectability by coherent combining by way of the channel response. In addition, coordinating signal transmissions of plural communication devices to effectively send the signals from plural locations to plural receiving communication devices minimizes the required power spectrum density of transmissions over the air, and enables embodiments of the present invention to enhance covert operations.

The above and still further features and advantages will become apparent upon consideration of the following detailed description of example embodiments of the present invention, particularly when taken in conjunction with the accompanying drawings wherein like reference numerals in the various figures are utilized to designate like components.

DETAILED DESCRIPTION OF EXAMPLE EMBODIMENTS

Embodiments of the present invention involve a signal combining technique in which signals are transmitted in a coordinated manner from plural communication devices (e.g., a "team" of devices) to a plurality of receiving communication devices. The plural receiving devices each receive a signal that is essentially a result of the coherently combined multipath signals at the receiver antenna. By using the time-reversed channel response to pre-condition the transmit signals, a Rake receiver is not needed to coherently combine multipath signals. The combined signal power enables reception of signals over ranges far greater than would otherwise be possible with a single device transmitting at the same single-device power level. The signals are transmitted from the communication devices with appropriate relative transmission time offsets and channels responses that are reversed in time. This enables the transmitted signals to arrive at one or more destination communication devices within the receivers' processing window synchronously (i.e., at approximately the same time).

When the time-reverse channel response is convolved with the synchronized transmit signals, the multipath signals that would normally arrive at the receiver at different time intervals arrive at the same time. In essence, the Rake receiver function is transferred from the receiver to the transmitter.

Significantly enhanced communications performance can be achieved by two-way Cooperative Time Reversed Team Communications (CTRTC) between a group of radios and a distant group of radios. For the case of one transmitter and one receiver, a probe signal is used between the transmitter and the receiver, and the channel propagation response between the intended receiver and the transmitter is measured. At the transmitter, the time reversed channel response is convolved with the intended information bearing signal before transmission. This process matches the transmitted signal to the propagation channel response between the intended receiver and the transmitter. Accordingly, the transmitted signal focuses spatially and compresses temporarily on the intended receiver. It can be shown that the CTRTC scheme maximizes the received signal-to-noise ratio (SNR) at the intended receiver. Using the many-to-many or team-to-team CTRTC configuration, the CTRTC can realize additional signal gain from the spatial diversity to further enhance the communication performance. As such, an intended group of receiving communication devices can each process the received signals to significantly improve the communications performance (e.g. quality of service, range, etc.) with efficient utilization of transmitting energy and limiting the detectability of individual transmitters.

Figure 1:
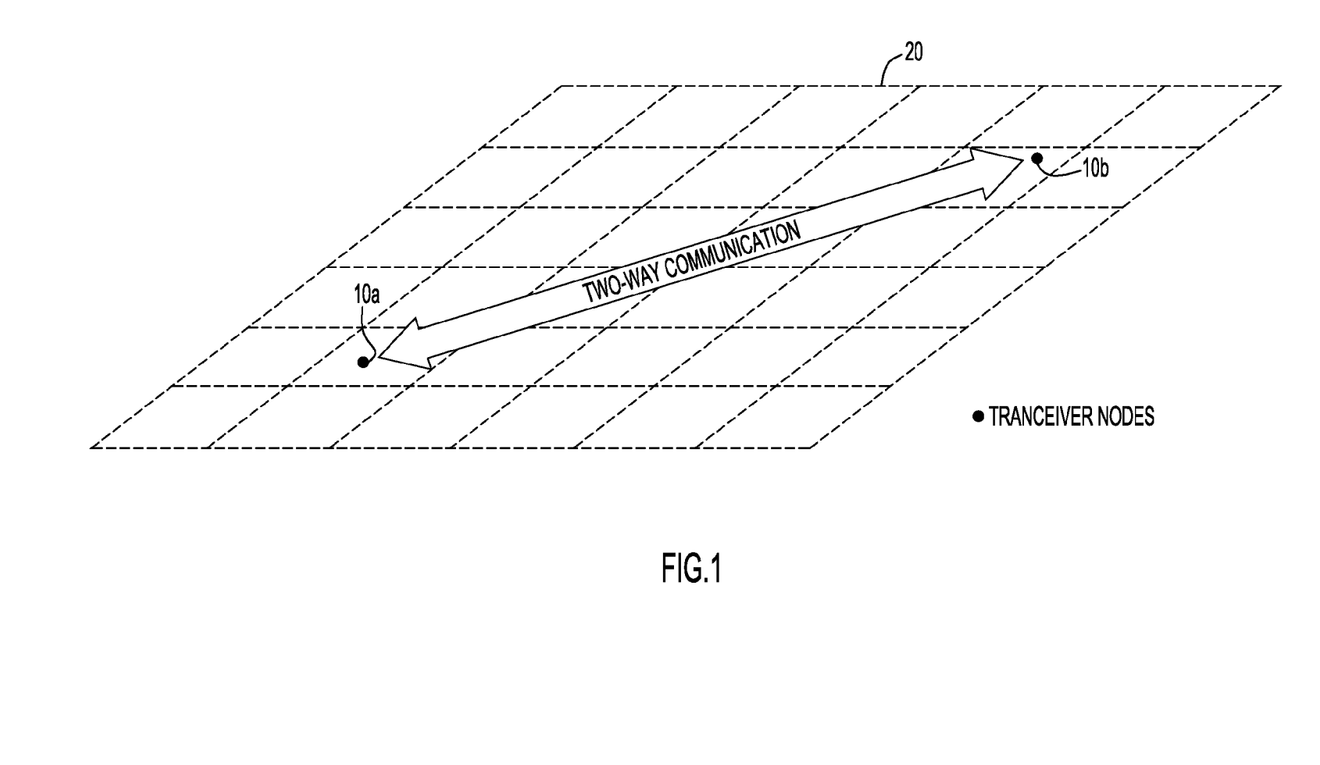
FIG. 1 is a conceptual representation of a transmitting communication device communicating with a remote receiving communication device by transmitting a time-reversed signal according to an embodiment of the present invention.

A representation of the concept underlying a present invention embodiment is illustrated in FIG. 1. A communication device or transceiver node 10a is located within a geographic region 20, while transceiver node 10b is located some distance from node 10a within the geographic region 20. Nodes 10a and 10b are in two-way communication. In this regard, nodes 10a and 10b communicate in a one-to-one configuration with each node using a time-reversed channel response to transmit signals to the other node.

To briefly illustrate, node 10b starts to transmit a signal to node 10a that is known to node 10a. For example, the signal may be transmitted with a known power and at a known frequency. In other examples, the known signal may be spread with a unique spreading code (e.g., a pseudo-noise (PN) sequence to distinguish the signal transmitted by node 10b from other signals that may be received by node 10a). In essence, the signal transmitted by node 10b may be considered a pilot tone or signal.

Once communication is established between node 10a and node 10b, pilots or the data communications may be used to determine or update channel responses between the nodes. Estimates of the channel response should be frequent enough to accommodate the channel response that varies with time. However, frequent channel response updates may reduce data throughput.

Since the signal transmitted by node 10b is known to node 10a, node 10a can derive the channel response from the received signal (i.e., the channel response is the difference between the known signal transmitted by node 10b and the signal received by node 10a). When node 10a transmits a signal to node 10b, node 10a can use the channel response learned from signals received from node 10b to improve communication system performance. As long as too much time has not passed, the channel response from node 10a to node 10b will be similar to the channel response from node 10b to node 10a, but reversed in time along the signal path. This "reversed in time" response is referred to herein as the "time-reversed channel response."

To improve the signal-to-noise ratio (SNR) at the receiver, a transmitting node convolves the time-reversed channel response with the information bearing signal prior to transmission. By convolving the time-reversed channel response with the signal prior to transmission, the transmitted signal would match to the channel response such that the receiver receives a higher quality signal.

Figure 2A:
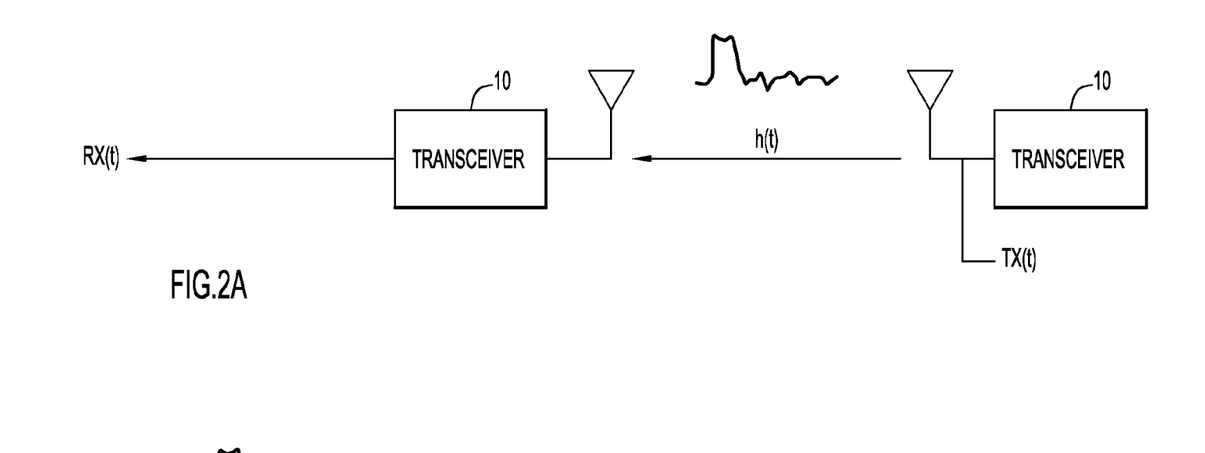
FIG. 2A is a diagrammatic illustration of the manner in which radio frequency channel response is estimated between a transmitter and a receiver according to an embodiment of the present invention.
Figure 2B:
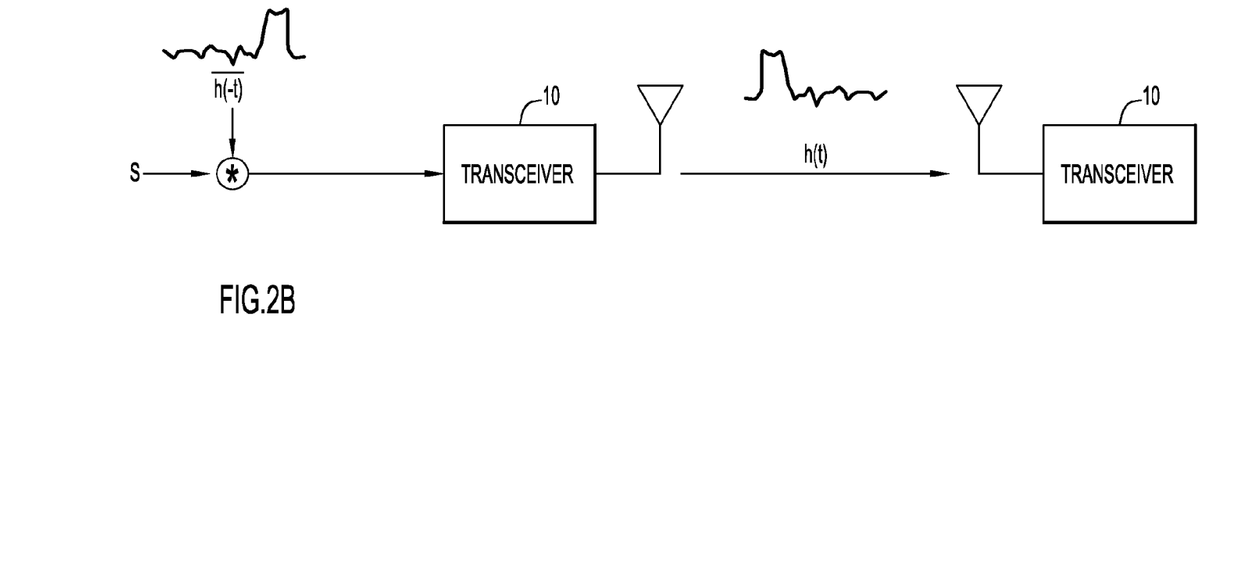
FIG. 2B is a diagrammatic illustration of the manner in which radio frequency channel response is time-reversed and convolved with an information signal according to an embodiment of the present invention.

An example implementation of the time-reversed channel response for one-to-one communication is illustrated in FIGS. 2A and 2B. In this example, node 10b in FIG. 2A transmits a signal TX(t), where t represents time. As the transmitted signal travels form node 10b to node 10a, channel effects degrade the signal. The channel effects are denoted collectively as the channel response, h(t). The analog signal trace above h(t) is an arbitrary channel response for purposes of illustration. Node 10a receives the TX(t) signal as RX(t) such that RX(t)=Ah(t)*TX(t), where A is a gain coefficient and * denotes the convolution operation. For a continuous-time channel response, the transmitter may theoretically transmit an impulse, and h(t) is the signal received at the receiver. For a discrete-time channel response, a correlated PN code output would provide an estimate of h(t) in a discrete-time representation.

After the channel response h(t) is estimated, node 10a generates the time-reverse channel response, denoted as $\overline{h(-t)}$ in FIG. 2B. The overline or vinculum in $\overline{h(-t)}$ indicates the complex conjugate. The analog signal trace above $\overline{h(-t)}$ is the mirror image of the analog signal trace for h(t). The mirror image illustrates that the channel response h(t) is time-reversed to produce $\overline{h(-t)}$. When node 10a desires to transmit an information bearing signal S, it convolves S with $\overline{h(-t)}$ as indicated in FIG. 2B. Once transmitted, the radio frequency (RF) signal is subject to the channel response, h(t). Since the channel effects have been compensated by $\overline{h(-t)}$ before transmission, node 10b can detect S with a higher signal-to-noise ratio (SNR). In effect, the physical channel response h(t) reverses the effect of $\overline{h(-t)}$.

Figure 3:
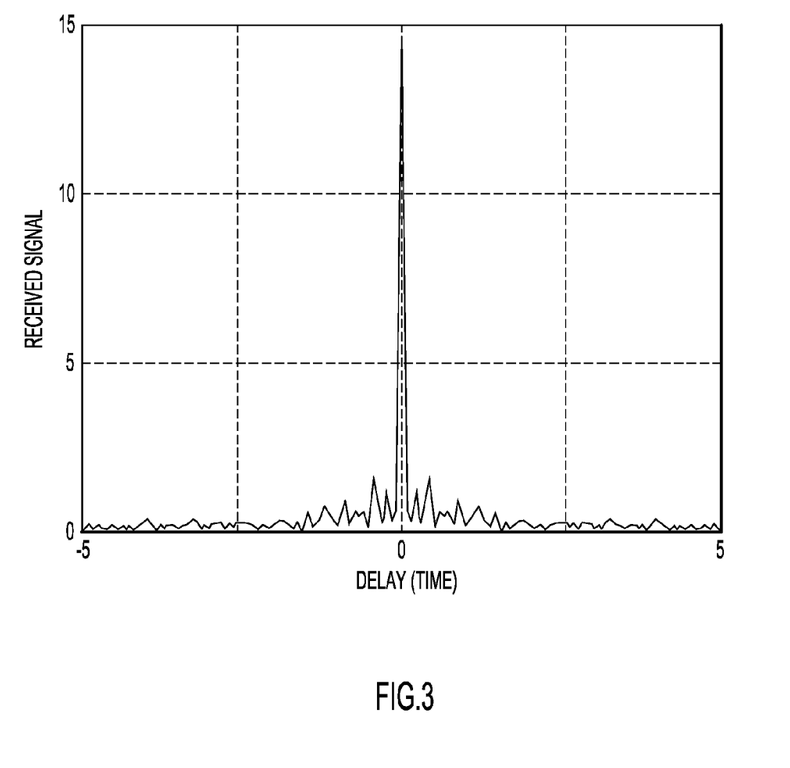
FIG. 3 is a graph illustrating the relationship between a received signal and the delay time for a single receiver according to an embodiment of the present invention.

The time-reversed communication technique of a present invention embodiment for one-to-one communication has been modeled and simulated using Matlab tools available from The Mathworks, Inc. of Natick, Mass. A graphical illustration of a received signal is illustrated in FIG. 3. FIG. 3 depicts the relationship between the magnitude of a received signal and signal time delay at the antenna. The signal magnitude and time delay are depicted in relative units. FIG. 3 indicates that most of the signal power is concentrated about a narrow time window and that multipath signals arriving before and after the primary signal are relatively weak. Accordingly, the receiver can process the primary signal without having to coherently combine a plurality of multipath signals using a Rake receiver. In a many-to-many communication scenario, the signals depicted in FIG. 3 are further compressed about delay time zero and approach an impulse response (e.g., the Dirac delta impulse response). Thus, in the many-to-many communication scenario, the channel response may be referred to herein as the channel impulse response (CIR).

Figure 4:
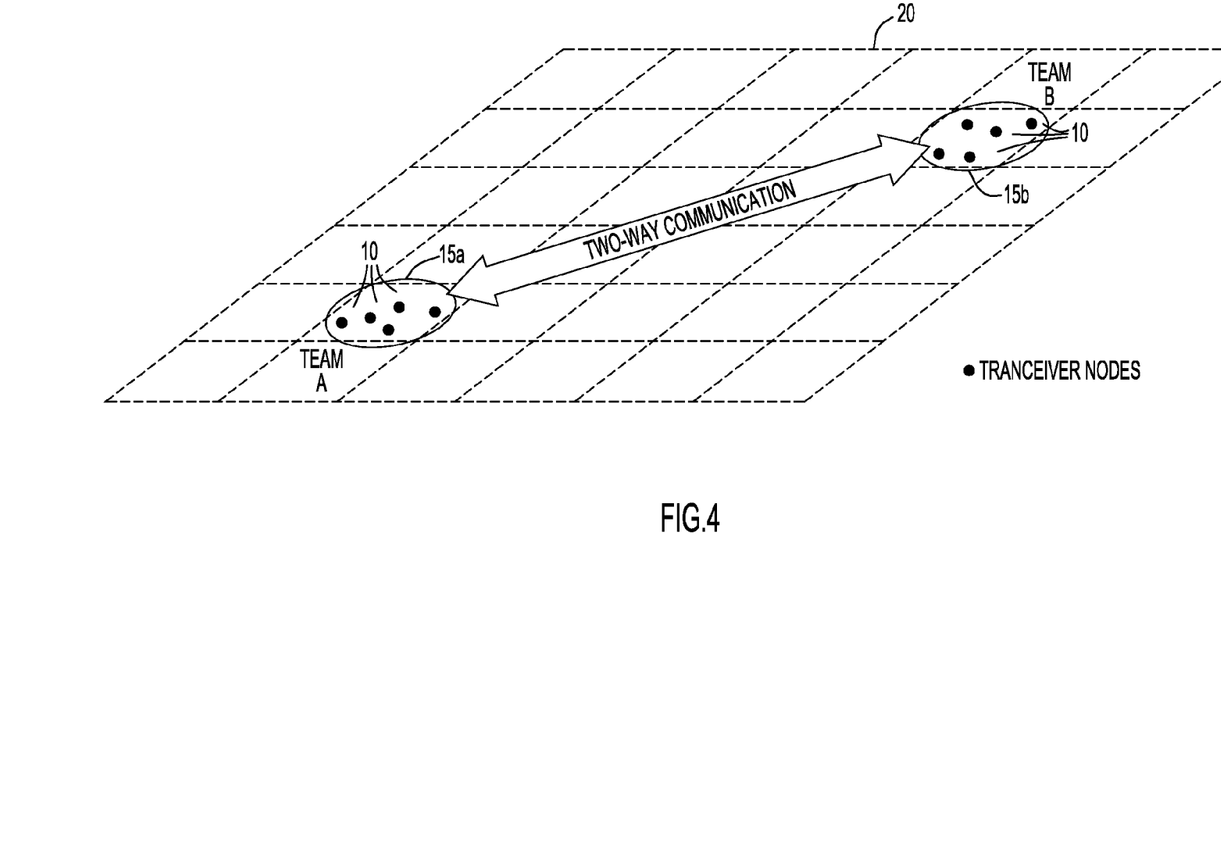
FIG. 4 is a conceptual representation of a plurality of transmitting communication devices of a group cooperatively communicating with a plurality of receiving communication devices of a distant group by synchronously transmitting time-reversed/convolved signals according to an embodiment of the present invention.

An example many-to-many communication scenario is illustrated in FIG. 4. Each of a plurality of communication devices or nodes 10 is located within a limited geographical area, such that each of the communication devices can communicate with at least one of the other communication devices 10 either directly or via routing, thereby enabling communication among the communication devices. Groups 15a, 15b of communication devices so arranged can be considered to be in a "cluster" or "team" (e.g., TEAM A and TEAM B as viewed in FIG. 4). Cluster 15a of communication devices 10 (e.g., TEAM A as viewed in FIG. 4) communicate with another group 15b of communication devices 10 (e.g., TEAM B as viewed in FIG. 4) by cooperatively transmitting the same information-bearing signal. For purposes of illustration TEAM A has a plurality of N transceivers and TEAM B has a plurality of M transceivers for an N×M team-to-team transceiver configuration.

As used herein and in the claims, the terms "cluster" and "team" refer to a set of two or more communication devices so positioned to permit a coordinated transmission of combinable signals from the communication devices. The communication devices of a cluster or team may be utilized for many practical military, commercial, and home applications. While the term cluster or team generally implies some degree of relatively close proximity, embodiments of the present invention are not limited to any particular maximum distance between devices in the cluster or maximum outer boundary for the cluster. Preferably, although not strictly required, all of the communication devices in a cluster are within the field of view or line of sight of each other, such that any two of the devices can communicate with each other directly. Alternatively, any two of the communication devices within a cluster may communicate via routing (e.g., with or without being in the line of sight). Some of the transmitting communication devices of cluster 15a may also be in motion relative to the other transmitting communication devices and to the receiving communication devices of cluster 15b.

As used herein and in the claims, a "communication device" or "communication unit" includes any device or unit, mobile or stationary, that includes a transmitter, receiver and/or processor and is capable of transmitting and/or receiving communication signals, including but not limited to: a handheld or body-mounted radio; any type of mobile or wireless telephone (e.g., analog cellular, digital cellular, PCS or satellite-based); a pager, beeper or PDA device; a radio carried on, built into or embedded in a ground-based or airborne vehicle; any portable electronic device equipped with wireless reception/transmission capabilities, including multimedia terminals capable of receiving/transmitting audio, video and/or data information; and any device or unit mounted in a fixed location with transmission/reception capabilities.

For the team-to-team or many-to-many CTRTC configuration, the radios in each team are synchronized. The source radios coordinate transmissions such that the source transmitters synchronously transmit the same information-bearing signal to the intended destination radios, so that the signals arrive at the destination radios can be synchronously combined. The combined signal has a greater signal-to-noise ratio than the individual received signals, permitting detection at a greater range or with a lower bit error rate. Therefore, significantly enhanced communications performance can be realized via the CTRTC.

While the signals transmitted from the different transmitting communication devices arrive at receiving communication devices at the same time, it should be understood that the signals are nevertheless transmitted on the same communication channel in much the same manner as multipath signals from a single transmitter are on the same communication channel. Thus, for example, if the system employs code division multiple access (CDMA), all of the transmitted signals are spread using the same code (e.g., the same PN code, Walsh function, etc.). Likewise, if the system employs frequency division multiple access (FDMA), all of the transmitted signals are on the same frequency channel within the available frequency band.

A plurality of communication devices 10 is remotely located from cluster 15a and forms cluster 15b. To be useful in transmitting signals to one or more receiving communication devices within cluster 15b, each of the communication devices of cluster 15a must be positioned such that its transmitted signals can travel over a path to one or more receiving communication devices of cluster 15b, and contribute to the power of the combined received signal. As shown in FIG. 1, the receiving communication devices of cluster 15b may be located at a considerable distance from the communication devices of cluster 15a. In fact, an important aspect of embodiments of the present invention is the ability to receive signals from a cluster of communication devices beyond the maximum reception range possible with an individual communication device transmitting at a specified power level. Due to the distance between clusters 15a and 15b, the signal quality of the communication between individual transmitting communication devices of cluster 15a and the receiving communication devices of cluster 15b may be poor. However, by synchronously combining each of the transmitted signals at each of the one or more intended receiving communication devices of cluster 15b as multipath rays corresponding to a single signal, the gain of the received signal may be significantly increased.

Figure 5:
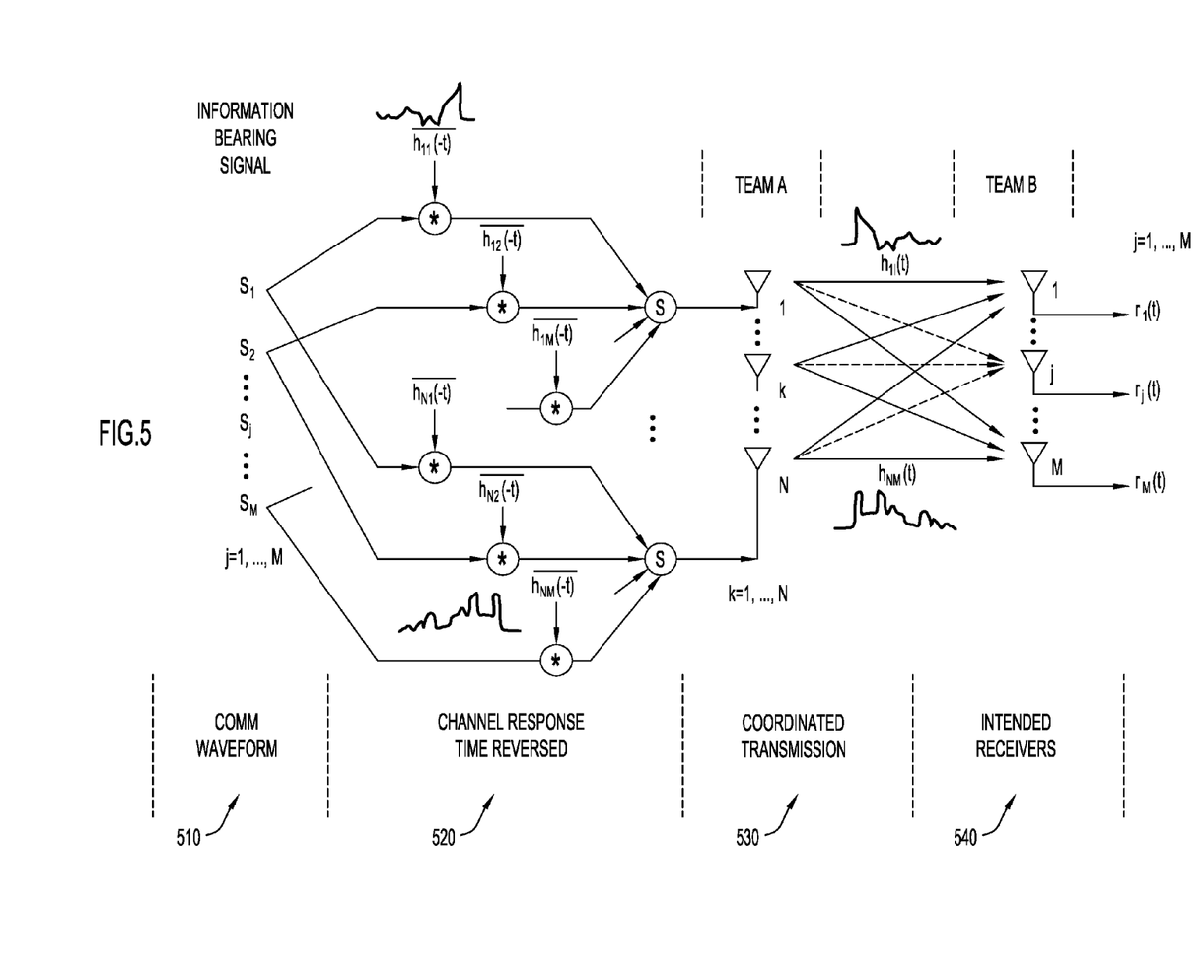
FIG. 5 is a diagram illustrating the manner in which plural signals are generated and transmitted by a plurality of transmitting communication devices to a plurality of receiving communication devices for cooperative communication according to an embodiment of the present invention.

A typical received response after the signal combining for an N×M team-to-team transceiver CTRTC configuration is illustrated in FIG. 5. Each of the variables shown in FIG. 5, as well as those variables in the equations described below, is indexed with subscripts indicating a source and destination. The M destination receivers associated with the M transceivers of TEAM B are indexed by the subscript j, for j=1 to M, and the N source transmitters associated with the N transceivers of TEAM A are indexed by the subscript k, for k=1 to N. TEAM A is configured to transmit the same information bearing signal S indexed as $S_j$ to TEAM B, for j=1 to M, i.e., the same information bearing signal S is destined for the M nodes of TEAM B. The information bearing signal S may contain data, voice, video, etc., as described above.

In this example, the N transceivers in TEAM A are already in communication with the M transceivers of TEAM B, and the channel response between each node 10 in TEAM A and TEAM B have been determined. The N transmitters of TEAM A are depicted by antennas labeled 1 . . . k . . . N, and the M receivers of TEAM B are depicted by antennas labeled 1 . . . j . . . M. The channel response h(t) between each node is denoted with subscripts as $h_{kj}(t)$, for k=1 to N, j=1 to M. Example channel responses are shown for $h_{11}(t)$ and $h_{NM}(t)$ (as viewed in FIG. 5).

The same information bearing signals $S_j$ are already modulated into an analog communications waveform as indicated at 510. The time-reversed channel responses, $\overline{h_{jk}(-t)}$, is convolved with the information bearing signals $S_j$ at 520. Example channel responses are shown for $\overline{h_{11}(-t)}$ and $\overline{h_{NM}(-t)}$ that mirror the time-reverse of the channel response shown for $h_{11}(t)$ and $h_{NM}(t)$ (as viewed in FIG. 5). The convolution is indicated by the circled asterisks, (*). In this example, each of the time-reversed channel responses for the first transceiver of TEAM A, $\overline{h_{1j}(-t)}$, for j=1 to M, are convolved with corresponding information bearing signals $S_j$, for j=1 to M (as shown in FIG. 5). For example, $\overline{h_{11}(-t)}$ is convolved with information bearing signal $S_1$, $\overline{h_{12}(-t)}$ is convolved with information bearing signal $S_2$, and so on for M instances.

Similarly, each of the time-reversed channel responses for the last transceiver of TEAM A, $\overline{h_{Nj}(-t)}$, for j=1 to M, are convolved with corresponding information bearing signals $S_j$, for j=1 to M. For example, $\overline{h_{N1}(-t)}$ is convolved with information bearing signal $S_1$, $\overline{h_{N2}(-t)}$ is convolved with information bearing signal $S_2$, and so on for M instances. Intermediate transceivers 2 through N−1 follow a similar pattern such that each time-reversed channel response, $\overline{h_{kj}(-t)}$, is convolved with a corresponding information bearing signal $S_j$, for k=1 to N, j=1 to M. The convolved signals for each transceiver are then summed together prior to transmission.

A coordinated transmission by each of the transmitters is performed at 530. Each of the transceivers in FIG. 5 is synchronized and has a common time base. For example, the transceivers may use Global Positioning System (GPS) or other satellite signal, or they may coordinate a time-of-day (TOD) among themselves. In order to achieve a synchronously combined signal at each receiver, each transmitter must compensate for the propagation delay from each transmitter to each receiver for coordinated transmission.

The transceivers may employ time slots to aid synchronization. By way of example, each transceiver in TEAM B transmits its pilot signal at the beginning of a first time slot (e.g., as employed by time division duplex (TDD) systems). The pilots from each of the transceivers in TEAM B will be received by the various transceivers in TEAM A at different times due to variations in distance between each transmitting transceiver and each receiving transceiver. The last pilots received are from the transceivers that are farthest apart.

Accordingly, in order to synchronously combine the signals for coordinate transmission of the information bearing signals, each transceiver in TEAM A compensates for the propagation delay by delaying each individual convolved signal for an appropriate interval such that the transmitted signals arrive at each transceiver in TEAM B at approximately the same time. The last pilots received and the associated channel responses will correspond to the first convolved signal components to be transmitted by TEAM A. TEAM A will then begin transmission at the beginning of a second time slot. When implemented in a synchronized system, the time-reversed channel response will automatically provide the appropriate delay since it is a time domain signal. Alternatively, mathematical or electronic delay elements may be used.

After transmission by TEAM A, the signals are exposed to radio frequency (RF) channel effects that degrade the signals. However, by virtue of the techniques described herein, the channel responses $h_{kj}(t)$ are pre-compensated for by the time-reversed channel responses $\overline{h_{kj}(-t)}$. In essence, the physical channel deconvolves the time-reversed channel responses $\overline{h_{kj}(-t)}$ such that the transceivers in TEAM B receive the information bearing signals $S_j$ at approximately the same time. Accordingly, the signal power received from each transceiver in TEAM A is additive and results in a higher signal-to-noise ratio (SNR) at each transceiver in TEAM B. To achieve maximum combined power, each of the information bearing signals $S_j$ should be the same signal.

The system described in connection with FIG. 5 can be formulated mathematically. Denoting the $j^{th}$ information bearing signal as $s_j(t)$, the channel impulse response between $k^{th}$ transmitter and $j^{th}$ receiver as $h_{kj}(t)$, and the time-reversed signal from the $k^{th}$ transmitter to the $j^{th}$ receiver as $x_{kj}(t)$, which describes the two-way Cooperative Time Reversed Team Communications (CTRTC) as:

$$x_{kj}(t) = \overline{h_{kj}(-t)} * s_j(t) \quad \text{(Equation 1)}$$

where k=1 ... N, and j=1 M, and N and M denote the number of participating transmitters and receivers, respectively as described above.

The received signal at the $j^{th}$ receiver can be shown as:

$$r_j(t) = \sum_{k=1}^{N} h_{kj}(t) * (A_{kj} x_{kj}(t)) \quad \text{(Equation 2)}$$

where $A_{kj}$ is the power control gain between $k^{th}$ transmitter and $j^{th}$ receiver.

Substituting the expression of Equation 1 into Equation 2 gives:

$$r_j(t) = \sum_{k=1}^{N} h_{kj}(t) * (A_{kj} \overline{h_{kj}(-t)} * s_j(t))$$

$$= \left( \sum_{k=1}^{N} A_{kj} h_{kj}(t) * \overline{h_{kj}(-t)} \right) * s_j(t)$$

or equivalently, $$r_j(t) = \left( \sum_{k=1}^{N} A_{kj} R_{h_{kj} h_{kj}} \right) * s_j(t) \quad \text{(Equation 3)}$$

where $R_{h_{kj} h_{kj}}$ denotes the autocorrelation matrix of $h_{kj}$. Accordingly, the well known autocorrelation matrix $R_{h_{kj} h_{kj}}$ indicates that the desired signal is received at each receiver.

For the CTRTC system, the theoretic bound on the capacity (bits/s/Hz), denoted by C, is given by:

$$C = \log_2 \left| I_M + \frac{P_T}{\sigma^2} H H^T \right|$$

where H is the M×N (number of receive antennas by the number transmit antennas) channel matrix, $I_M$ is the M×M Identity matrix, $P_T$ is the total transmit power, $\sigma^2$ is the noise power at each receiver, the superscript T indicates the Hermitian operator, and |•| indicates the determinant.

Figure 6:
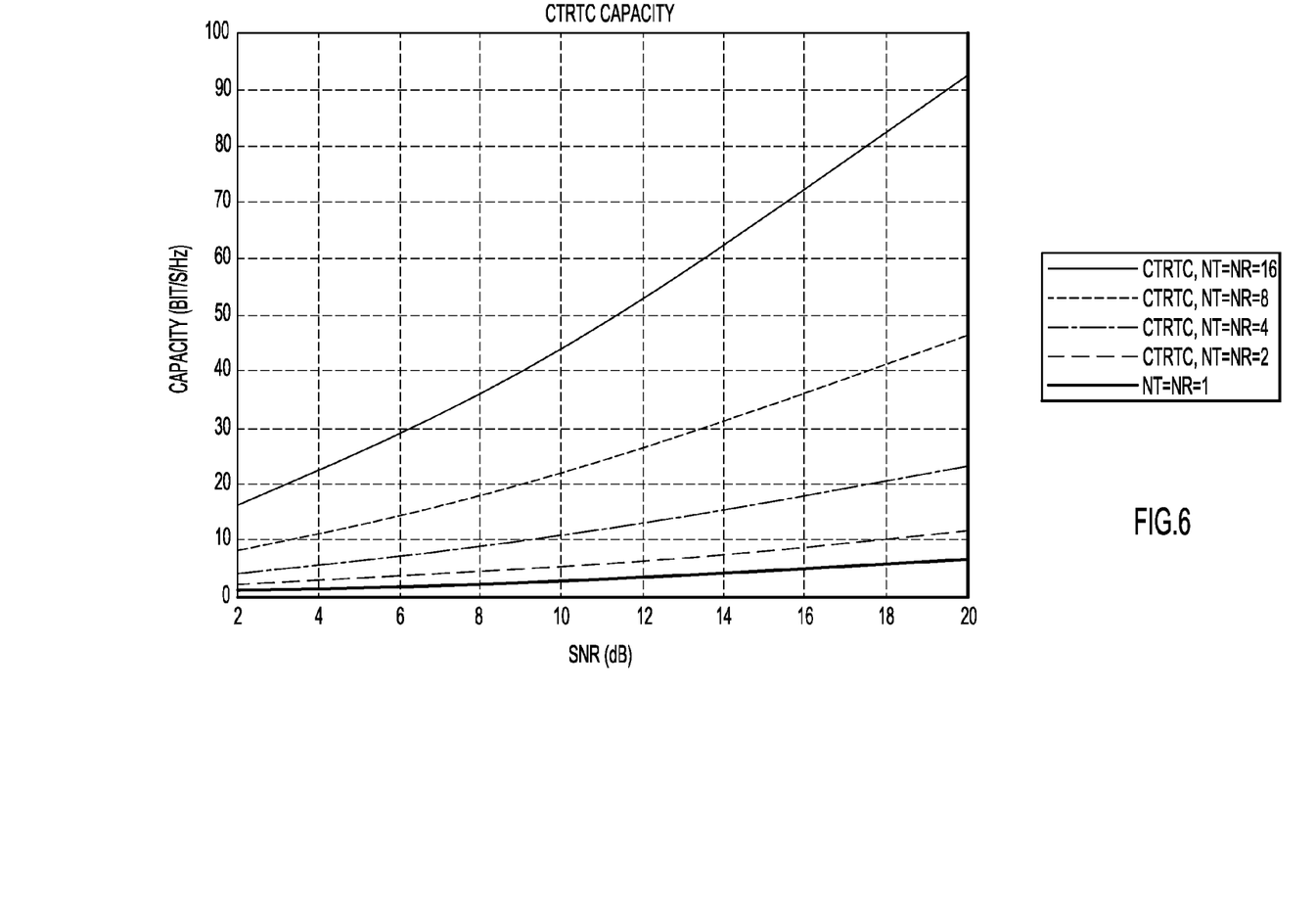
FIG. 6 is a graph illustrating the relationship between channel radio frequency capacity and the signal-to-noise ratio for various numbers of transmitters and receivers cooperatively communicating according to embodiments of the present invention.

A Matlab simulation for the theoretic bound on the capacity (bits/s/Hz) of a CTRTC system is illustrated in FIG. 6. FIG. 6 depicts the relationship between the capacity and signal-to-noise. Simulation results are shown for cases in which the number of transmitters (NT) is equal to the number of receivers (NR). Cases are shown for singleton communications with one transmitter and one receiver, and for cooperative communications with 2, 4, 6, 8, and 16 transmitters and receivers. As depicted in FIG. 6, the capacity increases as the number of transmitters and receivers increases.

Figure 7:
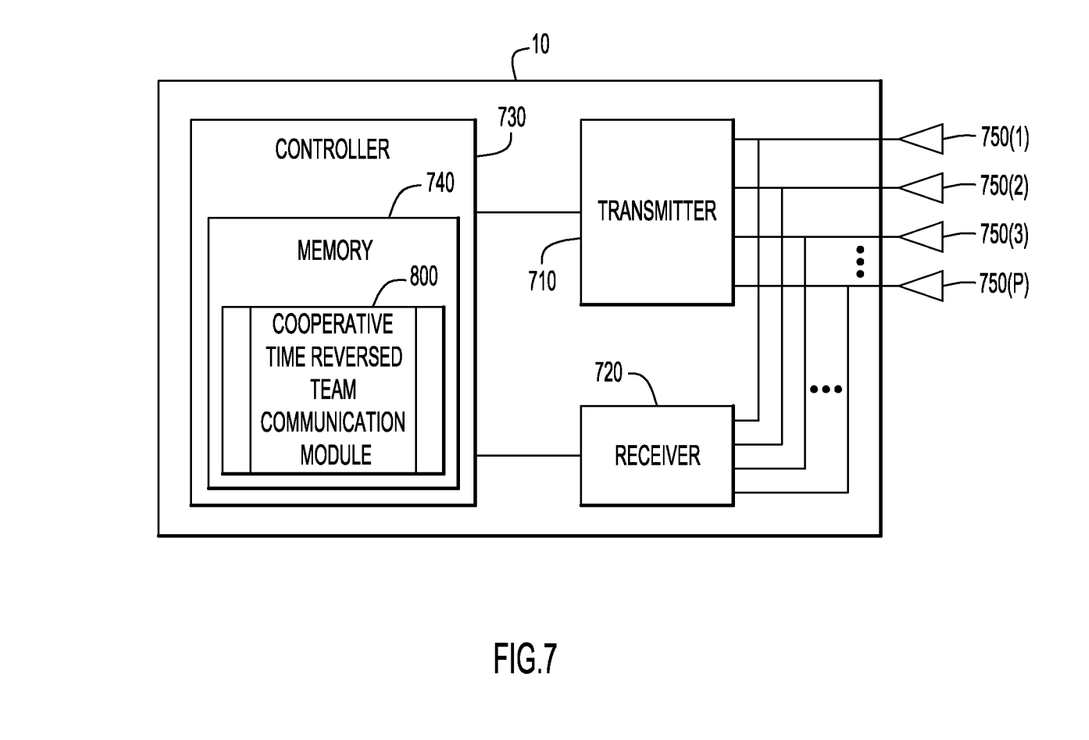
FIG. 7 is a block diagram of an example communication device employed by embodiments of the present invention.

An example communication device 10 employed by present invention embodiments is illustrated in FIG. 7. Specifically, communication device 10 includes a processor or controller 730, a memory 740, and a transmitter 710 and receiver 720 combination coupled to a plurality of antennas 750(1)-750(P). The communication device may further include other components in accordance with a particular application (e.g., speaker, microphone, processing components, display screen, sensors, etc.). The processor is preferably implemented by a conventional microprocessor or controller and controls the communication device to transmit and receive messages in accordance with the cooperative communication scheme and protocols described below. The transmitter is preferably implemented by a conventional transmitter and transmits messages from the processor, preferably in the form of radio frequency (RF) signals, in accordance with processor instructions. Receiver 720 is typically implemented by a conventional receiver, and configured to receive signals, preferably in the form of radio frequency (RF) signals, transmitted by the transmitter of another communication device. The receiver may process and forward the received signals to processor 730. Memory 740 is configured with a Cooperative Time Reversed Team Communications (CTRTC) module 800. CTRTC module 800 will be described in detail in connection with FIG. 8.

While the advantages of embodiments of the present invention are readily apparent in scenarios where the cluster of receiving communication devices is located relatively far from the cluster of transmitting communication devices, it should be understood that embodiments of the present invention are not limited to any particular receiving cluster location or any particular minimum range from the transmitting cluster. For example, the signal combining technique of embodiments of the present invention can be implemented such that when a receiving communication device of the receiving cluster is well within the operating range of the transmitting devices, the transmit power of each of the transmitting devices can be reduced accordingly.

The communication devices in the transmitting cluster convolve the same source signal with respective time-reversed channel responses and transmit the convolved signals to one or more receiving communication devices in the receiving cluster, and coordinate their respective transmit times such that the signals arrive at each of the one or more receiving communication devices at approximately the same time such that signals are constructively combined at each receiver in the receiving cluster.

As previously noted, because of the distributed locations of the transmitting communication devices and the varying transmission times, the transmissions from the cluster of transmitting communication devices would normally arrive at the one or more receiving communication devices at different time offsets relative to one another. However, in accordance with embodiments of the present invention, at each of the one or more receiving communication devices, the signals transmitted from the individual communication devices in the transmitting cluster are already time offset and inherently incorporate different multipath time offsets such that they arrive at the receiving communication devices as if they were of a single transmission without using a multipath combiner device, such as an equalizer or Rake receiver.

The combined signal has a greater signal-to-noise ratio than the individual received signals, permitting detection at a greater range or with a lower bit error rate without having to increase the transmit power of any individual transmitter. Consequently, enhanced signal reception and range performance can be achieved in systems where transmit power is limited by operational constraints or equipment limitations.

It should be understood that present invention embodiments are not limited to any particular protocol, messaging scheme, or type of channel access, and are useful in any context or network that would benefit from an increase in the power of received signals resulting from the combined power of distributed transmitters.

Further, consider a network of communication devices which transmit with very low power due to cost, power and/or RF emissions considerations. While many if not all of the communication devices in the network may be within each other's fields of view, the power limitations may make direct communications between certain devices impossible. One conventional solution to this problem would be to relay messages using intermediate devices in the network. In accordance with an embodiment of the present invention, another approach is for the device from which the message originates to command devices within its operating range to simultaneously transmit signals containing the same message, such that the intended receiving devices, which may not be within the operating range of the originating device alone, is nevertheless within the extended reception range resulting from combining the signals of the group of transmitters. In this manner, the technique of present invention embodiments may avoid delivering the signal via multiple "hops" (e.g., through multiple intermediate devices), and may potentially simplify signal routing algorithms and reduce the need for routing tables in certain types of networks.

The signal combining technique of present invention embodiments has applicability in the context of military or covert field operations. For example, a squad of soldiers or a reconnaissance team equipped with radios may be required to transmit using very low power levels to minimize the risk of being discovered by hostile forces or revealing their location. At such power levels, reliable communications may be difficult to achieve between individual radios in the squad and one or more receivers located at a considerable distance from the squad. In accordance with a present invention embodiment, range performance can be enhanced in this scenario without increasing the transmit power of individual radios in the squad by transmitting the CTRTC signals from some or all of the radios in the squad such that CTRTC signals are automatically combined at each of one or more distant receivers.

Figure 8A:
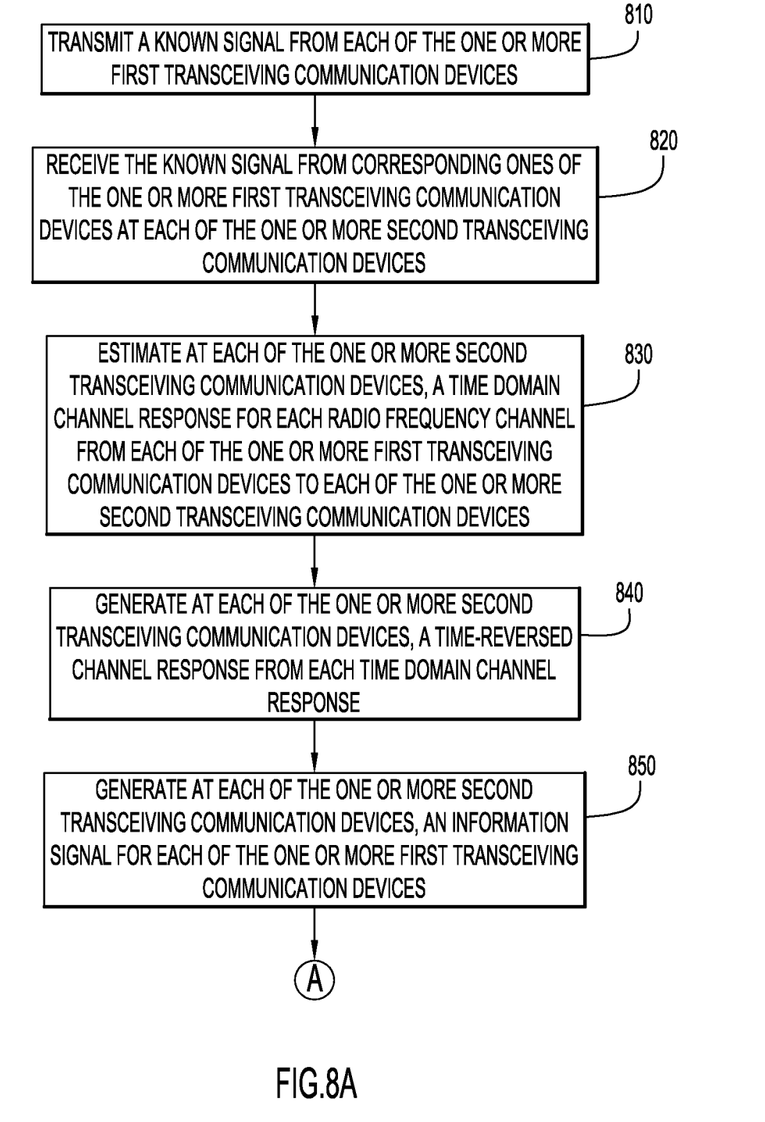
FIGS. 8A and 8B are procedural flow charts illustrating the manner in which cooperative communication is performed between teams of communication devices according to an embodiment of the present invention.
Figure 8B:
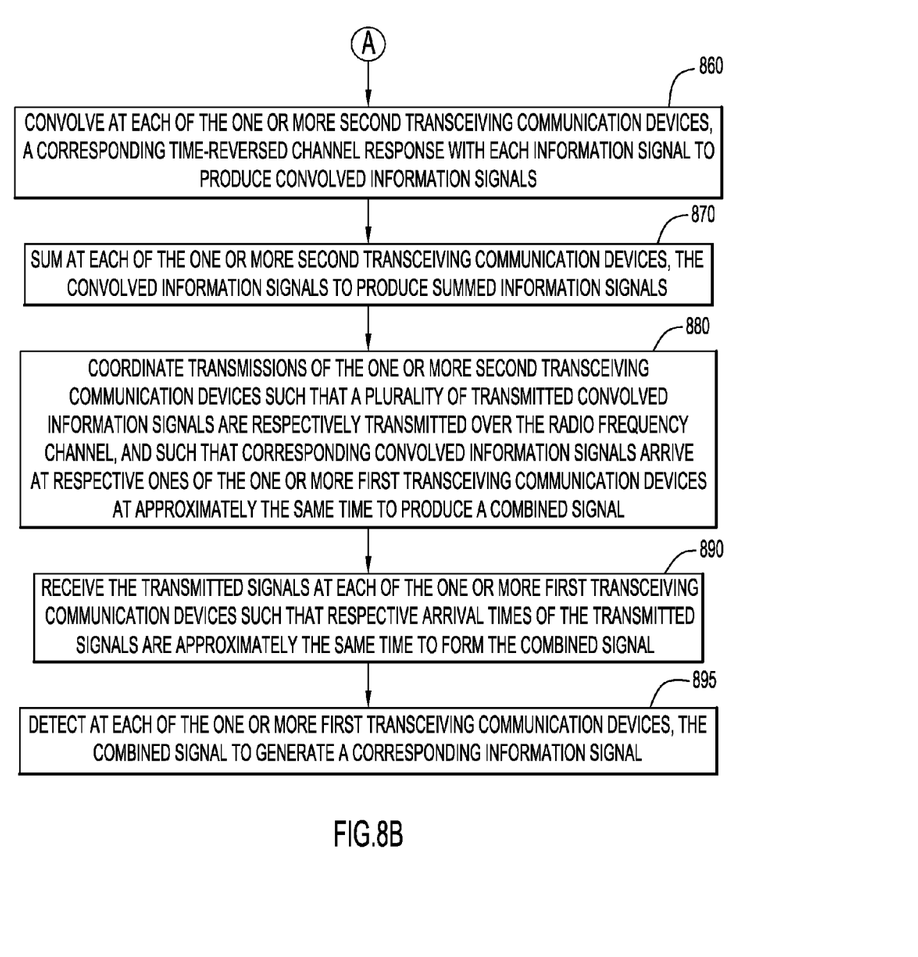

A procedural flow chart illustrating the manner in which cooperative communication is performed between teams of communication devices (e.g., by Cooperative Time Reversed Team Communications (CTRTC) module 800) is shown in FIGS. 8A and 8B. Referring first to FIG. 8A, a known signal is transmitted from each of the one or more first transceiving communication devices at step 810. The signal may include pilot signals or signal with known characteristics (e.g., power, PN spreading code, etc.) The known signal is received from corresponding ones of the one or more first transceiving communication devices at each of the one or more second transceiving communication devices at step 820. At each of the one or more second transceiving communication devices, a time domain channel response is estimated for each radio frequency channel from each of the one or more first transceiving communication devices to each of the one or more second transceiving communication devices at step 830. The time domain channel response may be a time domain channel impulse response.

At each of the one or more second transceiving communication devices, a time-reversed channel response is generated from each time domain channel response at step 840. Conceptually, the time-reversed channel response is a mirror image of the channel response about the Y-axis, yet in complex conjugate form. At each of the one or more second transceiving communication devices, an information signal is generated for each of the one or more first transceiving communication devices at step 850. The information signal may contain voice, video, or other operational data. At each of the one or more second transceiving communication devices, a corresponding time-reversed channel response is convolved or otherwise combined with each information signal to produce convolved information signals at step 860. At each of the one or more second transceiving communication devices, the convolved information signals are summed to produce summed information signals at step 870.

Transmissions of the one or more second transceiving communication devices are coordinated such that a plurality of transmitted convolved information signals are respectively transmitted over the same communication channel by the plurality of transmitting communication devices, and such that corresponding convolved information signals arrive at respective ones of the one or more first transceiving communication devices at approximately the same time to produce a combined signal at step 880. The transmitted signals are received at each of the one or more first transceiving communication devices such that respective arrival times of the transmitted signals are approximately the same to form the combined signal 890. The signals are coherently combined by way of the channel response to arrive as a single signal at the receivers. At each of the one or more first transceiving communication devices, the combined signal is detected to generate a corresponding information signal at step 895. To be combinable at the receiver, each information signal should be identical prior to convolution. Accordingly, an equalizer is not required at the receiver.

It will be appreciated that the embodiments described above and illustrated in the drawings represent only a few of the many ways of implementing a method and apparatus for cooperative communications between groups of communication units using a time-reversed channel response.

The communication networks may be of any type (e.g., wireless, wired, mobile, stationary, Ad-Hoc, any combinations thereof, etc.), and include any quantity of teams or clusters arranged in any fashion and disposed at any suitable locations. The teams or clusters may include any quantity of any types of communication devices, where the communication devices may be arranged within the clusters in any fashion and within any suitable geographic proximity (e.g., the cluster may encompass an area of any size or shape). Any quantity of communication devices within a team may receive combined transmitted signals, or may transmit a desired message. The power level for transmission may be adjusted based on the particular distance to the receivers. For example, in the case where receivers are located at a distance less than the transmission range of the transmitting cluster, the transmission power level of one or more of the transmitting communication devices may be reduced accordingly (e.g., due to the increased power levels from collective transmissions). Any communication devices within a cluster may initiate and/or transmit a message. Similarly, any communication devices within a cluster may receive the combined transmitted signals. The communication devices may communicate via any suitable communications medium (e.g., wireless communication devices, etc.).

The communication devices may include any quantity of conventional or other transmitters, receivers and/or transceivers, where each transmitter or transceiver may transmit signals at any suitable frequency and in any suitable energy form (e.g., radio signals, microwave, optical signals, etc.), and any quantity of conventional or other receivers or transceivers, where each receiver or transceiver may receive signals at any suitable frequency and in any suitable energy form (e.g., radio signals, microwave, optical signals, etc.). The receivers do not need to include Rake type receivers to combine and resolve the transmitted signals. The communication devices may include any quantity of independent transmitting and/or receiving devices, may utilize any quantity of frequency channels of any desired frequencies and may send any type of data. The communication devices may further include any quantity of any types of devices (e.g., processors, image capture, sensors, speakers, microphone, keypad, etc.) for a particular application. The communication devices may further include any quantity of any types of input or control devices (e.g., buttons, switches, etc.) to enter voice or data and control device operation, where the devices may be in the form of any type of radio unit or other communications device.

The processor of the communication devices may be implemented by any conventional or other microprocessor, controller or circuitry to perform the functions described herein, while any quantity of processors or processing devices or circuitry may be employed within the communication devices, where the processor functions may be distributed in any fashion among any quantity of hardware and/or software modules or units, processors or other processing devices or circuits (e.g., an application specific integrated circuit (ASIC) or a digital signal processor (DSP)). The software for the processor of the communication devices may be implemented in any suitable computer language, and could be developed by one of ordinary skill in the computer and/or programming arts based on the functional description contained herein and the flow charts and diagrams illustrated in the drawings. Further, any references herein of software performing various functions generally refer to processors performing those functions under software control. The software and/or algorithms described above and illustrated in the flow charts and diagrams may be modified in any manner that accomplishes the functions described herein. The communication devices may alternatively include any components arranged in any fashion to facilitate information transfer in the manner described above.

The software of the present invention embodiments may be available on a program product apparatus or device including a recordable or computer usable medium (e.g., magnetic or optical mediums, magneto-optic mediums, floppy diskettes, CD-ROM, DVD, memory devices, etc.), and/or may be downloaded (e.g., in the form of carrier waves, packets, etc.) to systems via a network or other communications medium.

The memory may be included within or external of the processor, and may be implemented by any conventional or other memory unit with any suitable storage capacity and any type of memory (e.g., random access memory (RAM), read only memory (ROM), etc.). The memory may store any desired information for performing the Cooperative Time Reversed Team Communications (CTRTC) techniques of present invention embodiments (e.g., CTRTC modules, data, etc.). The communications devices may an interface unit for networked communications that may be configured for communication over any desired network (e.g., wireless, cellular, LAN, WAN, Internet, Intranet, VPN, etc.).

Present invention embodiments may employ any quantity of variables or equations to estimate the time-reversed channel response. The equations may be represented in any desired form (e.g., matrix form, vectors, scalars, etc.), and be solved in any desired fashion to enable estimation of the time-reversed channel response. The time-reversed channel response may be produced and/or converted to any desired form (e.g., complex conjugates, etc.).

The receiver system may be implemented by any conventional or other components. These components may be implemented by any quantity of any combination of hardware and/or software units or modules. The detector may detect any quantity of peaks, and utilize any suitable threshold for detecting the peaks. The threshold utilized by the threshold detector may be of any suitable value or within any suitable range.

The antennas may be implemented by any conventional or other antenna (e.g., omni-directional, directional, smart, etc.)

configurable to transmit and receive the signals to and from the one or more other communications devices.

The transmission times (or transmission time offsets) of the transmitting communication devices may be set to any desired values enabling the transmitted signals to be constructively combined at the receiving communication devices. Basically, the transmission times (or transmission time offsets) should be set to values that enable each (or substantially each) of the transmitted signals to arrive at the various receivers at approximately the same time. This permits the signals to be resolvable by the receiving communication devices since a single signal is present at the receiver. In CDMA systems using a spreading code, the transmissions should arrive at the receiver within the same corresponding chip. Accordingly, the phrase "approximately at the same time" as used herein and in the claims in connection with transmitting signals means that the signals are received close enough in time to be combined by way of the radio frequency (RF) channel.

It should be understood that present invention embodiments are not limited to any particular protocol, messaging scheme, or type of channel access, and are useful in any context or network that would benefit from an increase in the power of received signals resulting from the combined power of distributed transmitters. The signal interchanges would preferably be cooperatively sent to ensure that the signal interchanges are within the multipath processing window of destination communication devices. Further, the communication devices of present invention embodiments may be stationary or mobile devices. The receiving team for a communication protocol may reply to a message from an originating team in substantially the same manner described above.

The transmission times or slots may be predetermined, or determined dynamically based on any suitable conditions (e.g., distances, locations of transmitting and/or receiving communication devices, etc.) and provided to the communication devices of a team in any fashion and via any communication technique or protocol. The distances may be determined based on GPS or other information.

From the foregoing description, it will be appreciated that the invention makes available a novel method and apparatus for cooperative time-reversed communications between groups of communication units using a time-reversed channel response, wherein transmissions from plural communication units of a group are synchronously combined at receiving communication units within a distant group to extend range performance while maintaining the communication protocol employed for the communication.

Having described preferred embodiments of a new and improved method and apparatus for cooperative communications between groups of communication units using a time-reversed channel response, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. In a communication system comprising one or more first transceiving communication devices and two or more second transceiving communication devices that are configured to coordinate transmission of the same information signals, a method of combining signals respectively transmitted from the one or more first transceiving communication devices, comprising:
    (a) estimating at each of the two or more second transceiving communication devices, a time domain channel response for a radio frequency channel from the one or more first transceiving communication devices to each of the two or more second transceiving communication devices based on receiving known signals transmitted from the one or more first transceiving communication devices;
    (b) generating at each of the two or more second transceiving communication devices, a time-reversed channel response from each time domain channel response;
    (c) convolving at each of the two or more second transceiving communication devices, a corresponding time-reversed channel response with an information signal to produce convolved information signals; and
    (d) summing and transmitting at each of the two or more second transceiving communication devices, the convolved information signals intended for the one or more first transceiving communication devices.

2. The method of claim 1, wherein step (a) includes receiving the known signals comprising a pilot signal.

3. The method of claim 1, wherein step (b) includes generating a complex conjugate of the time-reversed channel response.

4. The method of claim 1, wherein the information signals at each of the two or more second transceiving communication devices are identical.

5. The method of claim 1, wherein each time-reversed channel response comprises an appropriate delay such that corresponding summed information signals at step (d) arrive at respective ones of the one or more first transceiving communication devices at approximately the same time to produce a combined signal.

6. The method of claim 1, wherein step (d) further includes delaying each time-reversed channel response prior to transmitting each of the convolved information signals, the method further comprising:
    (e) receiving and detecting the transmitted signals at each of the one or more first transceiving communication devices to generate a corresponding information signal such
that corresponding transmitted information signals arrive at respective ones of the one or more first transceiving communication devices at approximately the same time to produce a combined signal.

7. The method of claim 1, wherein the transmitted signals arrive at the one or more first transceiving communication devices such that respective arrival times of the transmitted signals are approximately the same at the one or more first transceiving communication devices to form a constructively combined radio frequency signal.

8. The method of claim 1, wherein estimating the time domain channel response comprising a time domain channel impulse response.

9. The method of claim 1, wherein the transmitted signals are combined at the one or more first transceiving communication devices without using an equalizer.

10. The method of claim 1, wherein at least one of the one or more first transceiving communication devices, or at least one of the two or more second transceiving communication devices is a mobile communication device.

11. The method of claim 1, further comprising:
(e) establishing a common time reference among the one or more first transceiving communication devices and the two or more second transceiving communication devices.

12. The method of claim 11, wherein step (a) comprises receiving the known signals that were transmitted at a beginning of a first time slot by the one or more first transceiving communication devices.

13. The method of claim 12, wherein step (d) comprises coordinating transmissions of the two or more second transceiving communication devices such that a plurality of transmitted summed information signals are respectively transmitted over the radio frequency channel.

14. The method of claim 13, wherein step (d) comprises starting the coordinated transmissions at a beginning of a second time slot that follows the first time slot.

15. An apparatus comprising:
at least one antenna;
a receiver for receiving a known signal from two or more transceiving communication devices;
a processor configured to:
estimate a time domain channel response for a radio frequency channel between the two or more transceiving communication devices based on the received known signals;
generate a time-reversed channel response from each time domain channel response;
convolve a corresponding time-reversed channel response with an information signal to produce convolved information signals;
sum the convolved information signals to produce summed information signals; and
coordinate transmissions with other transceiving communication devices transmitting the summed information signals such that a plurality of transmitted summed information signals are respectively transmitted over the radio frequency channel; and a transmitter for transmitting the summed information signals via the at least one antenna.

16. The apparatus of claim 15, wherein the processor is further configured to establish a common time reference among the other transceiving communication devices.

17. The apparatus of claim 15, wherein the processor is configured to start the coordinated transmissions at a beginning of a time slot in a time division duplex (TDD) communication scheme.

18. The apparatus of claim 15, wherein the processor is configured to generate a complex conjugate of the time-reversed channel response.

19. The apparatus of claim 15, wherein the processor is configured to generate identical information signals for each of the two or more transceiving communication devices.

20. The apparatus of claim 15, wherein the processor is configured to generate each time-reversed channel response comprising an appropriate delay such that corresponding summed information signals arrive at respective ones of the two or more transceiving communication devices at approximately the same time to produce a combined signal.

21. The apparatus of claim 15, wherein the processor is configured to delay each time-reversed channel response prior to convolving, such that corresponding summed information signals arrive at respective ones of the two or more transceiving communication devices at approximately the same time to produce a combined signal.

22. The apparatus of claim 15, wherein the processor is configured to estimate the time domain channel response comprising a time domain channel impulse response.

23. A non-transitory computer readable medium with computer program logic recorded thereon that, when executed by a processor, cause the processor to
estimate a time domain channel response for a radio frequency channel for signals received from each of two or more transceiving communication devices based on received known signals;
generate a time-reversed channel response from each time domain channel response;
generate an information signal for each of the two or more transceiving communication devices;
convolve a corresponding time-reversed channel response with each information signal to produce convolved information signals; sum the convolved information signals to produce summed information signals for transmission; and
coordinate transmissions with other transceiving communication devices transmitting the summed information signals such that a plurality of transmitted summed information signals are respectively transmitted over the radio frequency channel with the time-reversed channel response incorporated therein.

24. The non-transitory computer readable medium of claim 23, wherein the processor is configured to establish a common time reference among the other transmitting transceiving communication devices.

25. The non-transitory computer readable medium of claim 23, wherein the processor is configured to start the coordinated transmissions at a beginning of a time slot in a time division duplex (TDD) communication scheme.

26. The non-transitory computer readable medium of claim 23, wherein the processor is configured to generate a complex conjugate of the time-reversed channel response.

27. The non-transitory computer readable medium of claim 23, wherein the processor is configured to generate identical information signals for each of the two or more transceiving communication devices.

28. The non-transitory computer readable medium of claim 23, wherein the processor is configured to generate each time-reversed channel response comprising an appropriate delay such that corresponding summed information signals arrive at respective ones of the two or more transceiving communication devices at approximately the same time to produce a combined signal.

29. The non-transitory computer readable medium of claim 23, wherein the processor is configured to delay each time-reversed channel response prior to convolving, such that corresponding summed information signals arrive at respective ones of the two or more transceiving communication devices at approximately the same time to produce a combined signal.

30. The non-transitory computer readable medium of claim 23, wherein the processor is configured to estimate the time domain channel response comprising a time domain channel impulse response.

* * * * *